(12) United States Patent
Lin et al.

(10) Patent No.: US 7,095,942 B2
(45) Date of Patent: Aug. 22, 2006

(54) PLANAR LIGHT DEVICE

(75) Inventors: Jyh-Chain Lin, Tu-Chen (TW);
Ga-Lane Chen, Fremont, CA (US)

(73) Assignee: Hon Hai Precision Ind. Co., LTD, Taipei Hsien (TW)

( * ) Notice: Subject to any disclaimer, the term of this patent is extended or adjusted under 35 U.S.C. 154(b) by 0 days.

(21) Appl. No.: 10/966,217

(22) Filed: Oct. 15, 2004

(65) Prior Publication Data
US 2005/0084228 A1    Apr. 21, 2005

(30) Foreign Application Priority Data
Oct. 15, 2003   (TW) .............................. 92128503 A

(51) Int. Cl.
*G02B 6/10* (2006.01)
(52) U.S. Cl. ......................... 385/146; 385/37
(58) Field of Classification Search ................. 385/146
See application file for complete search history.

(56) References Cited

U.S. PATENT DOCUMENTS

| 5,363,294 A | 11/1994 | Yamamoto et al. |
| 5,703,667 A | 12/1997 | Ochiai |
| 6,671,452 B1 * | 12/2003 | Winston et al. ............. 385/146 |
| 2004/0022050 A1 * | 2/2004 | Yamashita et al. ............ 362/31 |
| 2004/0109663 A1 * | 6/2004 | Olczak ........................ 385/146 |
| 2005/0041178 A1 * | 2/2005 | Taniguchi et al. ............ 349/65 |
| 2005/0141844 A1 * | 6/2005 | Olczak ........................ 385/146 |

* cited by examiner

*Primary Examiner*—Sung Pak
(74) *Attorney, Agent, or Firm*—Wei Te Chung

(57) ABSTRACT

A planar light device (30) for emitting light beams, including a light guide plate (31) having a plurality of diffraction grating units (33). The light guide plate includes a light-emitting surface (313), an opposite bottom surface, and a light incident surface (311) disposed therebetween. A light source (32) is disposed adjacent to the light incident surface. The diffraction grating units cover the bottom surface of the light guide plate. Each diffraction grating unit is divided into a first part (A) and a second part (B), the first and second parts having different alignment directions from each other.

17 Claims, 2 Drawing Sheets

PLANAR LIGHT DEVICE

BACKGROUND OF THE INVENTION

1. Field of the Invention

The invention generally relates to planar light devices for liquid crystal display (LCD) devices.

2. Description of Prior Art

In general, an LCD device has the advantages of thinness, light weight, and low power consumption. For this reason, LCD devices are widely utilized in various types of electronic equipment, from pocket calculators to large-scale office automation equipment.

Conventionally, planar light devices are designed for use in an LCD device for backlighting purposes. The core element of the planar light device is a light guide plate (LGP). The LGP is generally a rectangular, transparent substrate. The LGP generally includes a light incident surface, a light-emitting surface and a bottom surface. Light emitted by a light source is guided to the light-emitting surface, then emits uniformly from the light-emitting surface. A plurality of dot patterns is disposed on the bottom surface, for making light emitted from the LGP more uniform. Such dot patterns for an LGP are disclosed in U.S. Pat. No. 5,363,294.

However, one problem with this kind of LGP is that a mirror image of the dot patterns can be see from the light-emitting surface, resulting in decreased brightness and uniformity of the LGP. In order to solve this problem, two diffusing sheets are generally added onto the light-emitting surface of the LGP, for attenuating the mirror image and improving a uniformity of light emitted from the LGP. However, this solution increases the cost of the planar light device.

U.S. Pat. No. 5,703,667 issued to Ochiai discloses an LGP utilizing the phenomenon of diffraction based on wave optics of light. Referring to FIG. 5, the LGP 2 is disposed within a planar surface illuminator 1. The LGP 2 has a diffraction grating 3 printed or worked on a bottom surface 2b thereof, and a light incident surface (not labeled) adjacent to a fluorescent tube 4. A ratio of a width of a grating part 3 relative to a width of an adjacent non-grating part 3' progressively increases with increasing distance away from the light incident surface. This enhances a uniformity of light intensity at a top surface 2a of the LGP 2.

However, the LGP 2 encounters certain problems as follows:

First, the uniformity of brightness of the LGP 2 is generally not satisfactory. This is because the lines of the diffraction grating 3 on the bottom surface 2b are parallel to each other, and parallel to the fluorescent tube 4. Thus, the diffraction grating 3 substantially diffracts the light rays emitted by the fluorescent tube 4, whereupon the diffracted light rays emit from the top surface 2a in a first direction which is orthogonal to the alignment of the diffraction grating 3. Other light rays are incident on the diffraction grating 3 in a second direction being parallel to the alignment thereof, and are diffracted only a little if at all, whereupon the diffracted light rays emit from the top surface 2a in substantially the second direction. Thus, only a little of the total light emits from the top surface 2a in the second direction. This results in a view angle problem; i.e., the light intensity of the LGP 2 in the second direction is far less than the light intensity in the first direction.

Second, the diffraction generated on the bottom surface 2b is inefficient. This is because there is a plurality of non-grating parts 3' on the bottom surface 2b of the LGP 2 interspersed among the diffraction gratings 3. The non-grating parts 3' cannot diffract light rays impinging thereon, thus decreasing an overall brightness of the LGP 2.

SUMMARY OF THE INVENTION

An object of the present invention is to provide a planar light device having good viewing angle characteristics and high brightness.

To achieve the above object, a planar light device in accordance with the present invention comprises a light guide plate, a light source and a plurality of diffraction grating units. The light guide plate coupling the light source to guide light rays emitted therefrom and convert the light rays into planar light. The diffraction grating units cover a bottom surface of the light guide plate. Each diffraction grating unit is divided into a first part and a second part, the first and second parts having different alignment directions from each other.

Other objects, advantages, and novel features of the present invention will become more apparent from the following detailed description when taken in conjunction with the accompanying drawings, in which:

DESCRIPTION OF THE PREFERRED EMBODIMENTS

Figure 1:
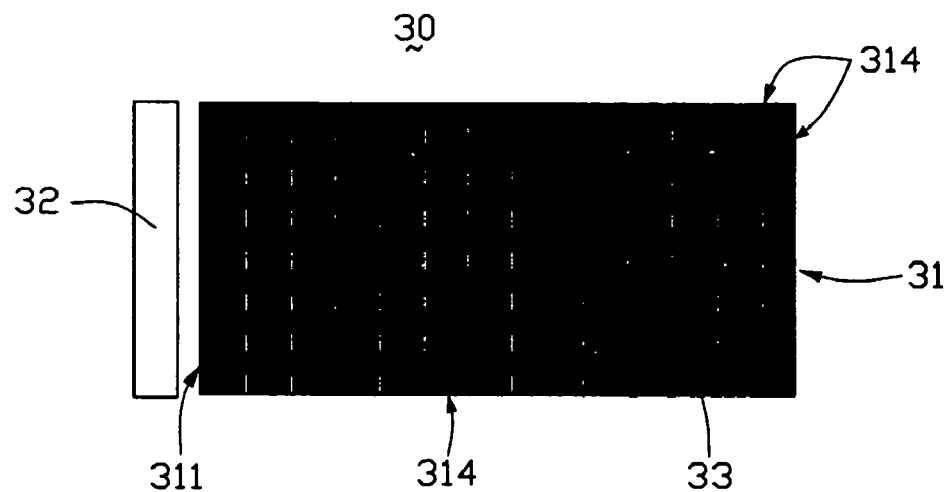
FIG. 1 is a bottom elevation of a preferred embodiment of a planar light device according to the present invention.

Referring to FIG. 1, a preferred embodiment of a planar light device 30 according to the present invention includes a rectangular, transparent LGP 31. The LGP 31 includes a light-emitting surface 313, a bottom surface (not labeled) opposite to the light-emitting surface 313, and a light incident surface 311 and a plurality of side surfaces 311, 314 adjoining the light-emitting surface 313 and bottom surface. The light incident surface 311 receives light emitted by a light source 32, and the side surfaces 314 are light reflection surfaces.

The light source 32 is a cold cathode fluorescent lamp (CCFL). In an alternative embodiment, the light source 32 may be a plurality of light emitting diodes (LEDs). In use of the planar light device 30, a reflection sheet (not shown) is placed under the bottom surface of the LGP 31, for reflecting light rays back into the LGP 31. A plurality of optical sheets (not shown), such as diffusing sheets or prism sheets, may be placed on the light-emitting surface 313 in order to make the illumination provided by the planar light device 30 more bright and uniform.

Figure 2A:
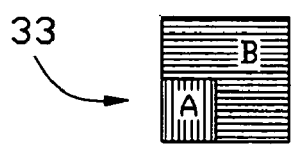
FIG. 2A is an enlarged view of one diffraction grating unit of a light guide plate of the planar light device of FIG. 1.

A plurality of diffraction grating units 33 is formed on the bottom surface of the LGP 31, and covers the entire bottom surface. For example, each diffraction grating unit 33 may take the form shown in FIG. 2A. Each diffraction grating unit 33 is generally rectangular, and is divided into a first part A and a second part B. The first part A is disposed in a corner of the diffraction grating unit 33, and the remainder of the diffraction grating unit 33 is occupied by the second part B. A profile of each of the first and second parts A, B is sawtooth-shaped. The first and second parts A, B have different alignment directions from each other. The alignment direction of the first part A is parallel to the light incident surface 311. The alignment direction of the second part B is orthogonal to the alignment direction of the first part A. A grating constant P of the diffraction grating unit 33 is in the range from 2 to 10 microns, and preferably 3 microns. A length W of the diffraction grating unit 33 is in the range from 1 to 5 microns, and preferably 1.5 microns. Each diffraction grating unit 33 defines a ratio of an area of the first part A relative to an area of the second part B. Among all the diffraction grating units 33, said ratio progressively increases with increasing distance away from the light incident surface 311.

The LGP 31 is made from transparent resin, such as polymethyl methacrylate (PMMA) or another suitable material. An index of refraction of the LGP 31 is greater than 1, for example 1.54. The diffraction grating units 33 are integrally formed with the LGP 31 by molding. The mold has corresponding internal grooves formed by machining. The diffraction grating units 33 may also be fabricated by in-mold molding, machining, printing or bonding. In in-mold molding, an inside of the mold is fitted with a hologram diffraction grating film for a diffraction grating having a grating constant P of 2–10 microns. In machining, grooves are formed on the bottom surface of the LGP 31 using a cutting tool or electron beams. In printing, grooves are printed on the bottom surface. In bonding, a hologram diffraction grating film is bonded to the bottom surface.

Figure 3:
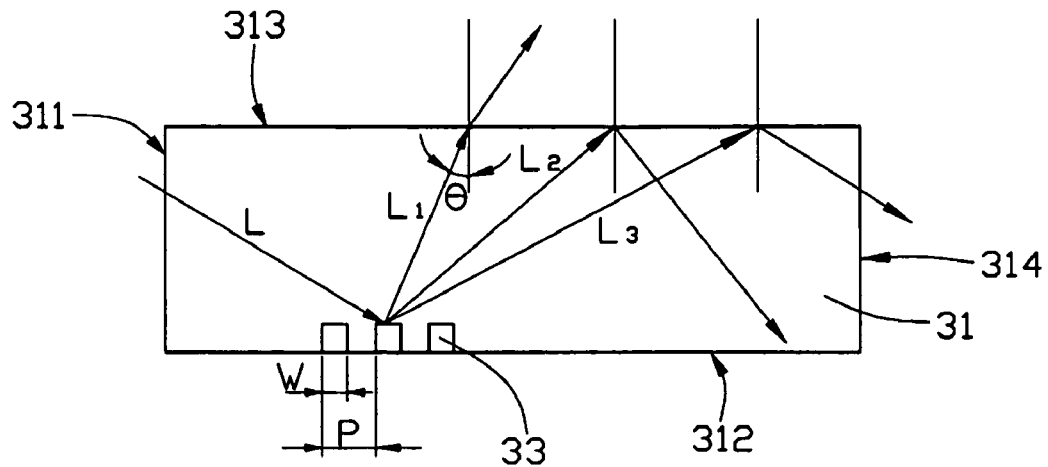
FIG. 3 is a schematic, side elevation of the light guide plate of FIG. 1, showing optical paths thereof.
Figure 4:
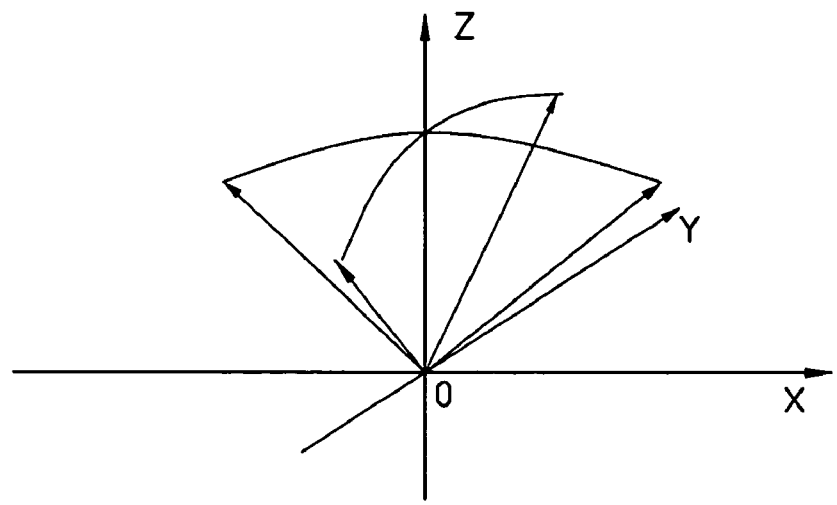
FIG. 4 is a schematic, light output diagram for the light guide plate of FIG. 1.
Figure 5:
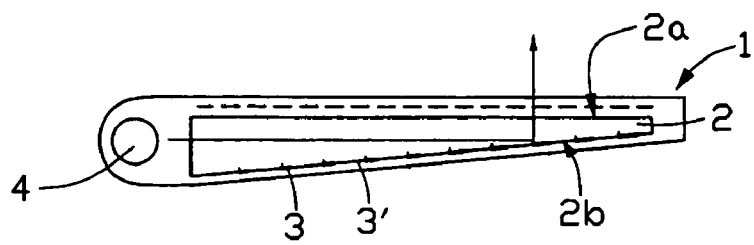
FIG. 5 is a schematic, side elevation of a conventional planar surface illuminator.

In operation of the planar light device 30, light rays L emitted from the light source 32 enter the LGP 31 and impinge upon the entire bottom surface. Since the first parts A of the diffraction grating units 33 are orthogonal to the light rays L, the light rays L are mainly diffracted by the first parts A. High intensity diffracted light rays are generated by the first parts A, and all lower order (e.g., $1^{st}$, $2^{nd}$ and $3^{rd}$ order) diffracted light rays $L_1$ exit from the light-emitting surface 313 of the LGP 31 (as shown by arrows in FIG. 3) in a first virtual plane defined by an X axis and a Z axis (as shown in FIG. 4). In addition, higher order light rays $L_2$ and $L_3$ are totally reflected by the light-emitting surface 313, because the incident angles of the light rays $L_2$ and $L_3$ are both greater than an angle of total internal reflection. Further, light rays impinging upon the second parts B of the diffraction grating units 33 in respective orthogonal directions are also diffracted. The lower order diffracted light rays exit from the light-emitting surface 313 of the LGP 31 in a second virtual plane defined by a Y axis and the Z axis (as shown in FIG. 4). That is, light rays emitted from the light-emitting surface 313 transmit in three-dimensional spaces, thus improving a brightness and uniformity of illumination provided by the planar light device 30.

In particular, because the whole of the bottom surface of the LGP 31 can diffract light, the brightness of the planar light device 30 is improved.

Generally, most of the light rays transmitting in the LGP 31 impinge on the diffraction grating units 33 in a direction orthogonal to the light incident surface 311, i.e. orthogonal to the first parts A of the diffraction grating units 33. Accordingly, said ratio of said areas of the first and second parts A, B progressively increases with increasing distance away from the light incident surface 311. Therefore a ratio of diffracted light intensity to incident light intensity progressively increases with increasing distance away from the light source 32. That is, a quantity of diffracted light increases in proportion to a decrease in a total quantity of light. The diffraction efficiency of the diffraction grating units 33 cooperating as a whole is increased. As a result, the light-emitting surface 313 of the LGP 31 is illuminated with high intensity light having uniform brightness.

In addition, the smaller the grating constant, the higher the diffraction efficiency. Therefore, in an alternative embodiment, the grating constants P of the first parts A of the diffraction grating units 33 can be configured to be progressively smaller with increasing distance away from the light incident surface 311.

Figure 2B:
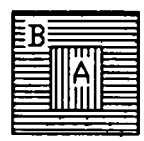
FIGS. 2B~2D are enlarged views of several alternative embodiments of diffraction grating units of the light guide plate of FIG. 1.
Figure 2C:
Figure 2D:
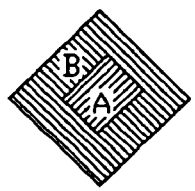

FIGS. 2B, 2C and 2D respectively show alternative forms which each diffraction grating unit 33 may take. In each of FIGS. 2B, 2C and 2D, the first part A is disposed in a middle of the second part B. In FIGS. 2C and 2D, the alignment of the first part A and the alignment of the second part B are both oblique to the light incident surface 311 of the LGP 31. In FIG. 2D, said obliquities are attained by configuring each diffraction grating unit 33 to be diamond-shaped rather than rectangular.

Further, in other alternative embodiments, the profile of each of the first and second parts A, B of the diffraction grating units 33 may be sinusoidal or dentiform, instead of sawtooth-shaped.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

The invention claimed is:

1. A planar light device for emitting light beams, comprising:
    a light source used to emit light rays;
    a light guide plate optically coupling with the light source to guide the light rays and to convert the light rays into planar light, the light guide plate having a bottom surface, a light-emitting surface opposite to the bottom surface, and a light incident surface adjoining the light-emitting surface and the bottom surface; and
    a plurality of diamond-shaped diffraction grating units formed on the bottom surface of the light guide plate, each diffraction grating unit being divided into a first part and a second part, the corresponding first and second parts having a different alignment direction orthogonal to the other and oblique to the light incident surface of the light guide plate, the corresponding first and second parts each including a plurality of grooves extending in the alignment direction associated therewith.

2. The planar light device as claimed in claim 1, wherein each diffraction grating unit defines a ratio of an area of the first part relative to an area of the second part, said ratio progressively increasing with increasing distance away from the light incident surface of the light guide plate.

3. The planar light device as claimed in claim 1, wherein a grating constant of the first part of each diffraction grating unit is defined, said constant progressively decreasing with increasing distance away from the light incident surface of the light guide plate.

4. The planar light device as claimed in claim 1, wherein the diffraction grating units are integrally formed with the light guide plate.

5. The planar light device as claimed in claim 1, wherein the diffraction grating units are bonded to the bottom surface of the light guide plate.

6. The planar light device as claimed in claim 1, wherein the first part is disposed in a corner of each diffraction grating unit, the remainder of the diffraction grating unit being occupied by the second part.

7. The planar light device as claimed in claim 1, wherein the first part is disposed in a middle of the second part of each diffraction grating unit.

8. The planar light device as claimed in claim 1, wherein a grating constant of each diffraction grating unit is in the range from 2 to 10 microns, and a length of each diffraction grating unit is in the range from 1 to 5 microns.

9. A planar light device for emitting light beams, comprising:
   a light source used to emit light rays;
   a light guide plate optically coupling with the light source to guide the light rays and to convert the light rays into planar light, the light guide plate having a bottom surface, a light-emitting surface opposite to the bottom surface, and a light incident surface adjoining the light-emitting surface and the bottom surface; and
   a layer of diamond-shaped diffraction gratings covering the bottom surface of the light guide plate, the diffraction gratings each having at least two orthogonal alignment directions associated therewith, the two orthogonal alignment directions being oblique to the light incident surface of the light guide plate, each diffraction grating including a plurality of grooves, each groove extending in the alignment direction corresponding thereto.

10. The planar light device as claimed in claim 9, wherein the layer of diffraction gratings defines a plurality of diffraction grating units, each diffraction grating unit defining a first part and a second part having the two orthogonal alignment directions, respectively.

11. The planar light device as claimed in claim 10, wherein each diffraction grating unit defines a ratio of an area of the first part relative to an area of the second part, said ratio progressively increasing with increasing distance away from the light incident surface of the tight guide plate.

12. The planar light device as claimed in claim 10, wherein a grating constant of the first part of each diffraction grating unit is defined, said constant progressively decreasing with increasing distance away from the light incident surface of the light guide plate.

13. The planar light device as claimed in claim 9, wherein the layer of diffraction gratings are integrally formed with the light guide plate, or bonded to the bottom surface of the light guide plate.

14. The planar light device as claimed in claim 10, wherein a grating constant of each diffraction grating unit is in the range from 2 to 10 microns, and a length of each diffraction grating unit is in the range from 1 to 5 microns.

15. A planar light device for emitting light beams, comprising:
   a light source used to emit light rays;
   a light guide plate optically coupling with the light source to guide the light rays and to convert the light rays into planar light, the light guide plate having a bottom surface, a light-emitting surface opposite to the bottom surface, and a light incident surface adjoining the light-emitting surface and the bottom surface; and
   a plurality of diamond-shaped diffraction grating units distributed on the bottom surface of the light guide plate, the diffraction grating units defining at least two orthogonal alignment directions commonly toward the light-emitting surface and oblique to the light incident surface of the light guide plate, each diffraction grating unit including a plurality of grooves, each groove extending in the alignment direction corresponding thereto.

16. The planar light device as claimed in claim 15, wherein said at least two orthogonal alignment directions are derived from two different grating regions closely associated with each other.

17. The planar light device as claimed in claim 15, wherein said at least two orthogonal alignment directions are essentially located in two different vertical planes intersecting with each other via a vertical intersection line.

* * * * *